(12) United States Patent
Hirata

(10) Patent No.: US 11,071,012 B2
(45) Date of Patent: Jul. 20, 2021

(54) BASE STATION, TERMINAL, AND WIRELESS COMMUNICATION SYSTEM

(71) Applicant: Fujitsu Limited, Kawasaki (JP)

(72) Inventor: Akira Hirata, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/823,498

(22) Filed: Mar. 19, 2020

(65) Prior Publication Data
US 2020/0221340 A1 Jul. 9, 2020

Related U.S. Application Data

(63) Continuation of application No. PCT/JP2017/035602, filed on Sep. 29, 2017.

(51) Int. Cl.
*H04W 28/06* (2009.01)

(52) U.S. Cl.
CPC ................... *H04W 28/06* (2013.01)

(58) Field of Classification Search
CPC ....... H04W 8/26; H04W 28/06; H04W 92/12; H04L 61/2046; H04L 61/103
See application file for complete search history.

(56) References Cited

U.S. PATENT DOCUMENTS

| 2019/0098536 A1* | 3/2019 | Qiao | H04W 36/0016 |
| 2019/0182895 A1* | 6/2019 | Di Girolamo | H04W 36/0011 |
| 2019/0313479 A1* | 10/2019 | Myhre | H04W 80/12 |
| 2020/0127968 A1* | 4/2020 | Tang | H04L 41/0813 |
| 2020/0154262 A1* | 5/2020 | Yu | H04W 28/0268 |
| 2020/0163009 A1* | 5/2020 | Chen | H04W 76/10 |
| 2020/0186490 A1* | 6/2020 | Bhaskaran | H04L 61/103 |
| 2020/0213914 A1* | 7/2020 | Shen | H04L 45/121 |

FOREIGN PATENT DOCUMENTS

JP 2017-50747 A 3/2017

OTHER PUBLICATIONS

Ericsson, "Separation of CP and UP", Agenda Item: 9.2.1, 3GPP TSG-RAN WG1 Meeting #76, RP-171215, West Palm Peach, Florida, USA, Jun. 5-8, 2017.
3GPP TR 38.801 V14.0.0, 3rd Generation Partnership Project; Technical Specification Group Radio Access Network; Study on new radio access technology: Radio access architecture and interfaces (Release 14), Mar. 2017.
International Search Report issued by the Japan Patent Office for corresponding International Patent Application No. PCT/JP2017/035602, dated Oct. 31, 2017 with an English translation.

(Continued)

*Primary Examiner* — Syed Ali
(74) *Attorney, Agent, or Firm* — Myers Wolin, LLC

(57) ABSTRACT

A base station includes a first processing unit and a second processing unit that processes a wireless signal. The first processing unit includes a third processing unit that processes a control signal and a fourth processing unit that processes user data. The third processing unit shares, with the fourth processing unit, a second terminal identifier used in user-data processing performed in the second processing unit and the fourth processing unit.

8 Claims, 16 Drawing Sheets

(56) References Cited

OTHER PUBLICATIONS

Extended European search report with supplementary European search report and the European search opinion issued by the European Patent Office for corresponding European Patent Application No. 17927832.0, dated Jun. 2, 2020.
Intel Corporation, "General principles of separation of CP and UP for high level functional split", Agenda Item: 22.1, 3GPP TSG-RAN WG3 Meeting NR#2, R3-172285, Qingdaq, China, Jun. 26-28, 2017.
Huawei, "UE Context Management on F1", Agenda Item: 10.10.1, 3GPP TSG-RAN WG3 Meeting #96, R3-171852, Hangzhou, P. R. China, May 15-19, 2017.
Samsung et al., "Text proposal for TS38.401 on intra-CU/inter-DU mobility and lost packet retransmission", Agenda Item: 10.10.1.6, 3GPP TSG-RAN WG3 Meeting #97, R3-172957, Dresden, Germany, Aug. 21-25, 2017.
Samsung, "RRC messages over F1 interface", Agenda Item: 10.10.1, 3GPP TSG-RAN WG3 Meeting #96, R3-171633, Hangzhou, P. R. China, May 15-19, 2017.
3GPP TS 38.401 v0.2.0, "3rd Generation Partnership Project; Technical Specification Group Radio Access Network; NG-RAN; Architecture description (Release 15)", Jul. 2017.
3GPP TS 38.473 v0.3.0, "3rd Generation Partnership Project; Technical Specification Group Radio Access Network; NG-RAN; F1 application protocol (F1AP) (Release 15)", Sep. 2017.
Notice of Reasons for Refusal issued by the Japan Patent Office for corresponding Japanese Patent Application No. 2019-544133, dated Apr. 20, 2021, with an English translation.
Ericsson et al., "Idle to Connected state transitions in a disaggregated gNB with E1 interface", 3GPP TSG-RAN WG3 Meeting #97, R3-173253, Berlin, Germany, Aug. 21-25, 2017.

\* cited by examiner

2410

| NON-USE LIST | | IN-USE LIST | |
|---|---|---|---|
| START VALUE | RANGE | START VALUE | RANGE |
| 00000 | 10000 | 10000 | 20000 |
| 30000 | 5000 | 35000 | 5000 |
| ⋮ | ⋮ | ⋮ | ⋮ |

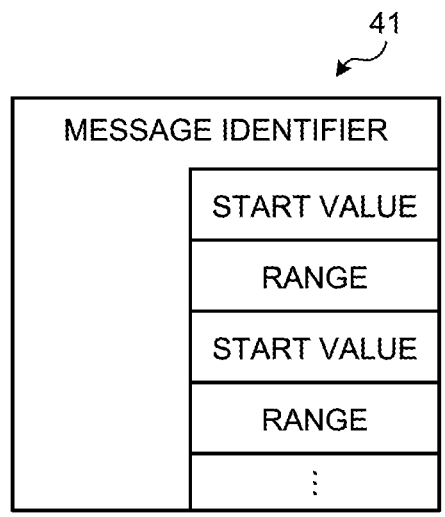

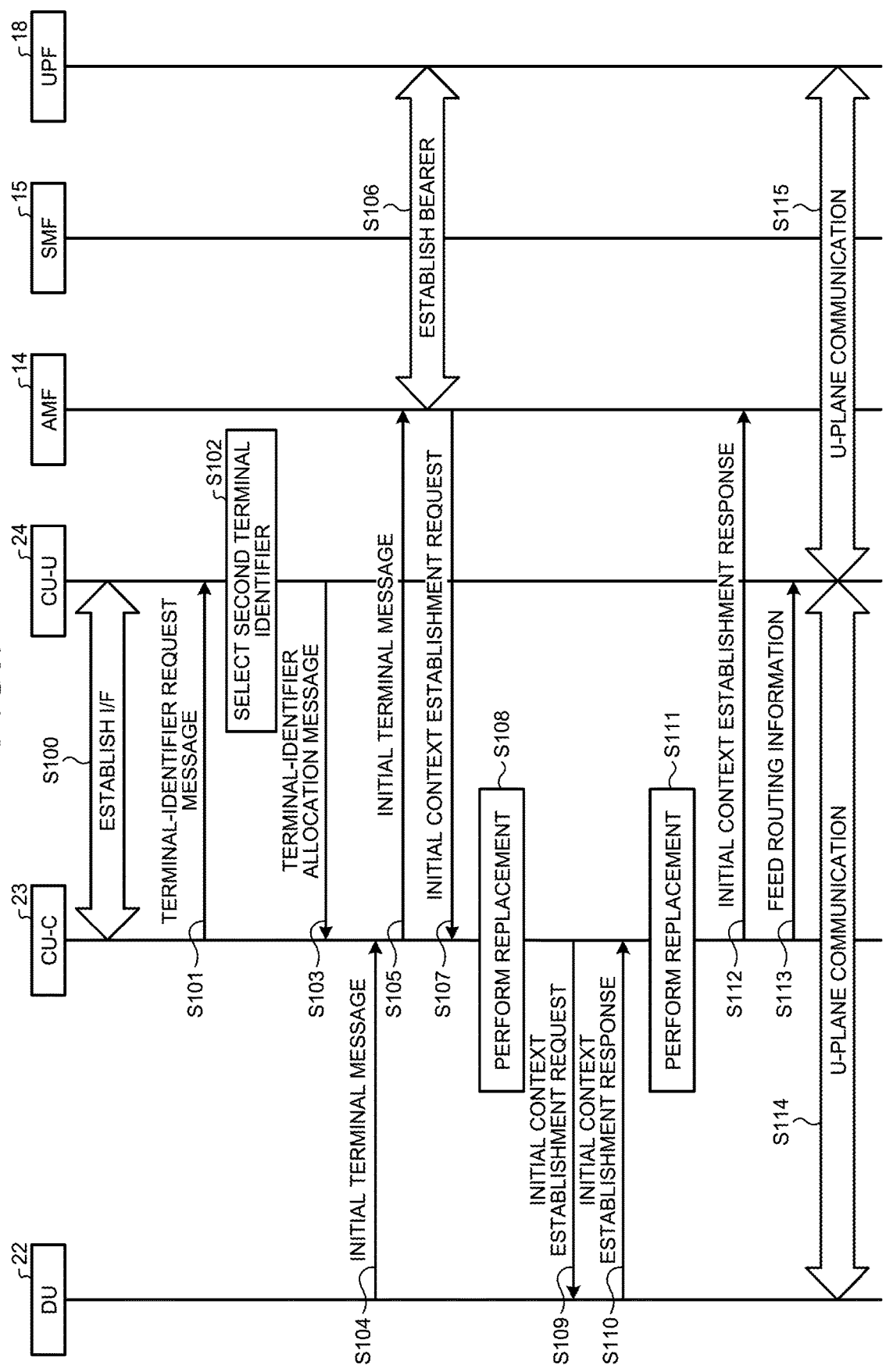

BASE STATION, TERMINAL, AND WIRELESS COMMUNICATION SYSTEM

CROSS-REFERENCE TO RELATED APPLICATION

This application is a continuation application of International Application PCT/JP2017/035602, filed on Sep. 29, 2017, and designating the U.S., the entire contents of which are incorporated herein by reference.

FIELD

The present invention relates to a base station, a terminal, a processing method, and a wireless communication system.

BACKGROUND

To deal with increase of messages and traffic in a fifth-generation mobile network, concentration and distribution of processing at a base station have been discussed. For example, CU (central unit)/DU (distributed unit) separation has been discussed to distribute processing at the base station (for example, refer to Non Patent Literature 1 below). In the CU/DU separation, message processing is separated among nodes at a protocol level so that higher-level protocols are processed at the CU and lower-level protocols are processed at the DU. In the base station, CUs and DUs can be combined in the ratio of 1:N or N:1.

In addition, C/U separation, in which C-Plane as control signals is separated from U-Plane as data traffic, has been discussed. In a network to which the C/U separation is applied, some base stations can only transmit and receive U-Plane signals without transmitting and receiving C-Plane signals to and from a core. In a base station that transmits and receives only U-Plane signals to and from the core, control signals are controlled through cooperation with another base station that transmits and receives C-Plane signals to and from the core.

When the CU/DU separation and the C/U separation are both applied to the base station, C-Plane signals and U-Plane signals can be separately processed at a CU (for example, refer to Non Patent Literature 2 below). In Non Patent Literature 2 below, at the base station, the CU is separated into a CU-C that processes C-Plane signals, and a CU-U that processes U-Plane signals. The correspondent node of the CU-C is an access and mobility management function (AMF), and the correspondent node of the CU-U is a user plane function (UPF). Conventional technique is described in 3GPP TR38.801 V14.0.0 and RP-171215.

When a bearer of a terminal is to be established, the AMF specifies a terminal identifier identifying the terminal to a UPF that processes U-Plane signals. Bearers of a plurality of terminals are established at the UPF in some cases. In such a case, the UPF can distinctively process the bearer of each terminal because each terminal identifier is unique at the UPF.

However, when one base station establishes bearers to a plurality of UPFs and the AMF specifies a terminal identifier to each UPF, the terminal identifiers of some UPFs are potentially duplicate. To avoid this, the CU-C can reallocate a unique terminal identifier to combination of each UPF and the corresponding terminal identifier. The reallocated terminal identifier is fed to the CU-U, and the CU-U transmits and receives U-Plane signals to and from the UPF by using the terminal identifier fed from the CU-C.

However, when CU-Cs in a plurality of base stations share a CU-U in one base station and each CU-C reallocates a terminal identifier, the reallocated terminal identifiers of some CU-Cs are potentially duplicate. The duplication of reallocated terminal identifiers makes it difficult for the CU-U to distinctively process U-Plane signals transmitted to and received from a UPF.

SUMMARY

According to an aspect of an embodiment, a base station includes a first processing unit and a second processing unit that processes a wireless signal. The first processing unit includes a third processing unit that processes a control signal and a fourth processing unit that processes user data. The third processing unit shares, with the fourth processing unit, a second terminal identifier used in user-data processing performed in the second processing unit and the fourth processing unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an exemplary terminal-identifier allocation message.

FIG. 6 is a diagram illustrating an exemplary identifier table.

FIG. 7 is a sequence diagram illustrating an exemplary process of processing at a wireless communication system in the first embodiment.

DESCRIPTION OF EMBODIMENTS

Embodiments of a base station, a terminal, a processing method, and a wireless communication system disclosed in the present application will be described below in detail with reference to the accompanying drawings. The embodiments below do not limit the disclosed technology. The embodiments may be combined with each other as appropriate without inconsistency of processing contents.

First Embodiment

[Wireless Communication System 10]

Figure 1:
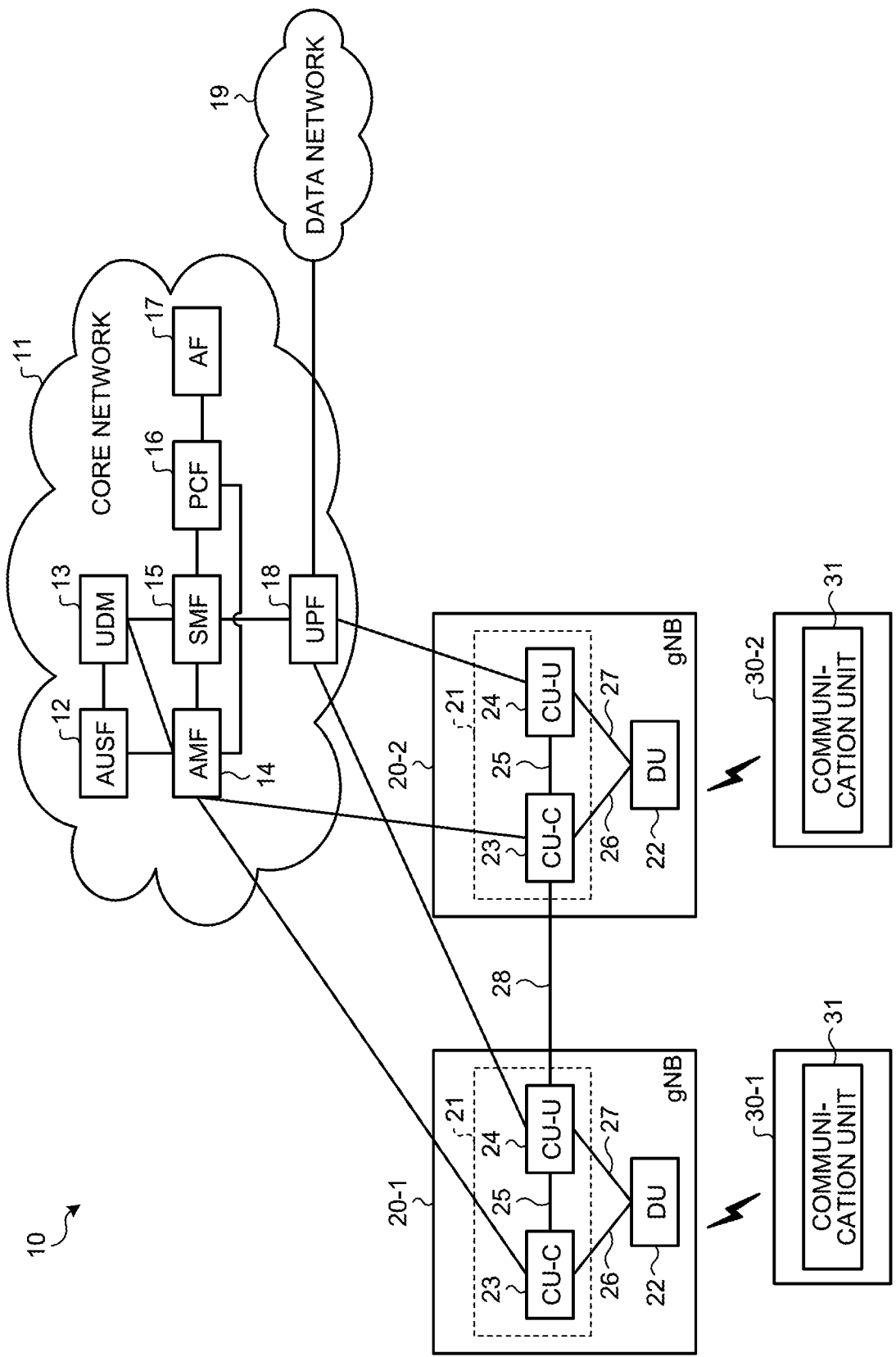
FIG. 1 is a diagram illustrating an exemplary wireless communication system.

FIG. 1 is a diagram illustrating an exemplary a wireless communication system 10. The wireless communication system 10 includes a core network 11, a plurality of gNBs (next generation Node B) 20-1 and 20-2, and a plurality of UEs 30-1 and 30-2. Hereinafter, the gNBs 20-1 and 20-2 are collectively referred to as gNBs 20 when not distinguished from each other, and the UEs 30-1 and 30-2 are collectively referred to as UEs 30 when not distinguished from each other. Each gNB 20 is connected with the core network 11 and controls wireless connection of the corresponding UE 30 to relay communication between the UE 30 and the core network 11. Each gNB 20 is an exemplary base station.

The core network 11 includes an authentication server function (AUSF) 12, a unified data management (UDM) 13, and an AMF 14. The core network 11 also includes a session management function (SMF) 15, a policy control function (PCF) 16, an application function (AF) 17, and a UPF 18. The AMF 14 and the UPF 18 are connected with each gNB 20, and the UPF 18 is also connected with a data network 19. The AMF 14 is an exemplary first higher-level device, and the UPF 18 is an exemplary second higher-level device.

Each gNB 20 includes a CU 21 and a DU 22. The CU 21 includes a CU-C 23 and a CU-U 24. The CU-C 23 and the CU-U 24 in the CU 21 are connected with each other through an interface (I/F) 25. The CU-C 23 and the DU 22 are connected with each other through an I/F 26. The CU-U 24 and the DU 22 are connected with each other through an I/F 27. The CU 21 is an exemplary first processing unit, and the DU 22 is an exemplary second processing unit. The CU-C 23 is an exemplary third processing unit, and the CU-U 24 is an exemplary fourth processing unit.

The DU 22 processes a lower-level protocol in wireless access and performs wireless communication with the UE 30. The DU 22 transmits a C-Plane signal received from the UE 30 to the CU-C 23 through the I/F 26 and transmits a U-Plane signal received from the UE 30 to the CU-U 24 through the I/F 27. In addition, the DU 22 wirelessly transmits a C-Plane signal received from the CU-C 23 through the I/F 26 to the UE 30 and wirelessly transmits a U-Plane signal received from the CU-U 24 through the I/F 27 to the UE 30. Each UE 30 includes a communication unit 31 that transmits and receives C-Plane and U-Plane signals to and from the CU 21 through wireless communication. A C-Plane signal is an exemplary control signal, and a U-Plane signal is exemplary user data.

The CU-C 23 performs C-Plane processing in a higher-level protocol in wireless access with the AMF 14 and acquires a first terminal identifier and information such as address information of the UPF 18 from the AMF 14. The information such as the address information of the UPF 18 is an exemplary higher-level identifier. Then, the CU-C 23 replaces the first terminal identifier acquired from the AMF 14 with a second terminal identifier unique at the CU-U 24 that processes a U-Plane signal identified by the first terminal identifier. The second terminal identifier is an identifier used to identify communication of the UE 30 at the CU 21 and the DU 22 and not duplicate at the CU 21 and the DU 22. Then, the CU-C 23 feeds the first terminal identifier, the second terminal identifier, and the information such as the address information of the UPF 18 to the CU-U 24 through the I/F 25. In addition, the CU-C 23 feeds the second terminal identifier and address information of the CU-U 24 to the DU 22. The CU-C 23 uses the second terminal identifier to identify U-Plane signals transmitted and received between the UE 30 and the CU-U 24.

The CU-U 24 identifies a U-Plane signal received from the DU 22 based on the second terminal identifier fed from the CU-C 23. Then, the CU-U 24 replaces the second terminal identifier with the first terminal identifier fed from the CU-C 23. Then, the CU-U 24 transmits the U-Plane signal corresponding to the replaced first terminal identifier to the UPF 18 corresponding to the address information fed from the CU-C 23.

In the present embodiment, for example, as illustrated in FIG. 1, the gNBs 20 include the gNB 20-1 including the CU-U 24 connected with the CU-C 23 in the other gNB 20-2 through an I/F 28. Thus, the CU-U 24 in each gNB 20 are connected with a plurality of CU-Cs 23 in some cases. Similarly, in the present embodiment, for example, as illustrated in FIG. 1, the gNBs 20 include the gNB 20-2 including the CU-C 23 connected with the CU-U 24 in the other gNB 20-1 through the I/F 28. Thus, the CU-C 23 in each gNB 20 is connected with a plurality of CU-Us 24 in some cases.

[Details of gNB 20]

Figure 2:
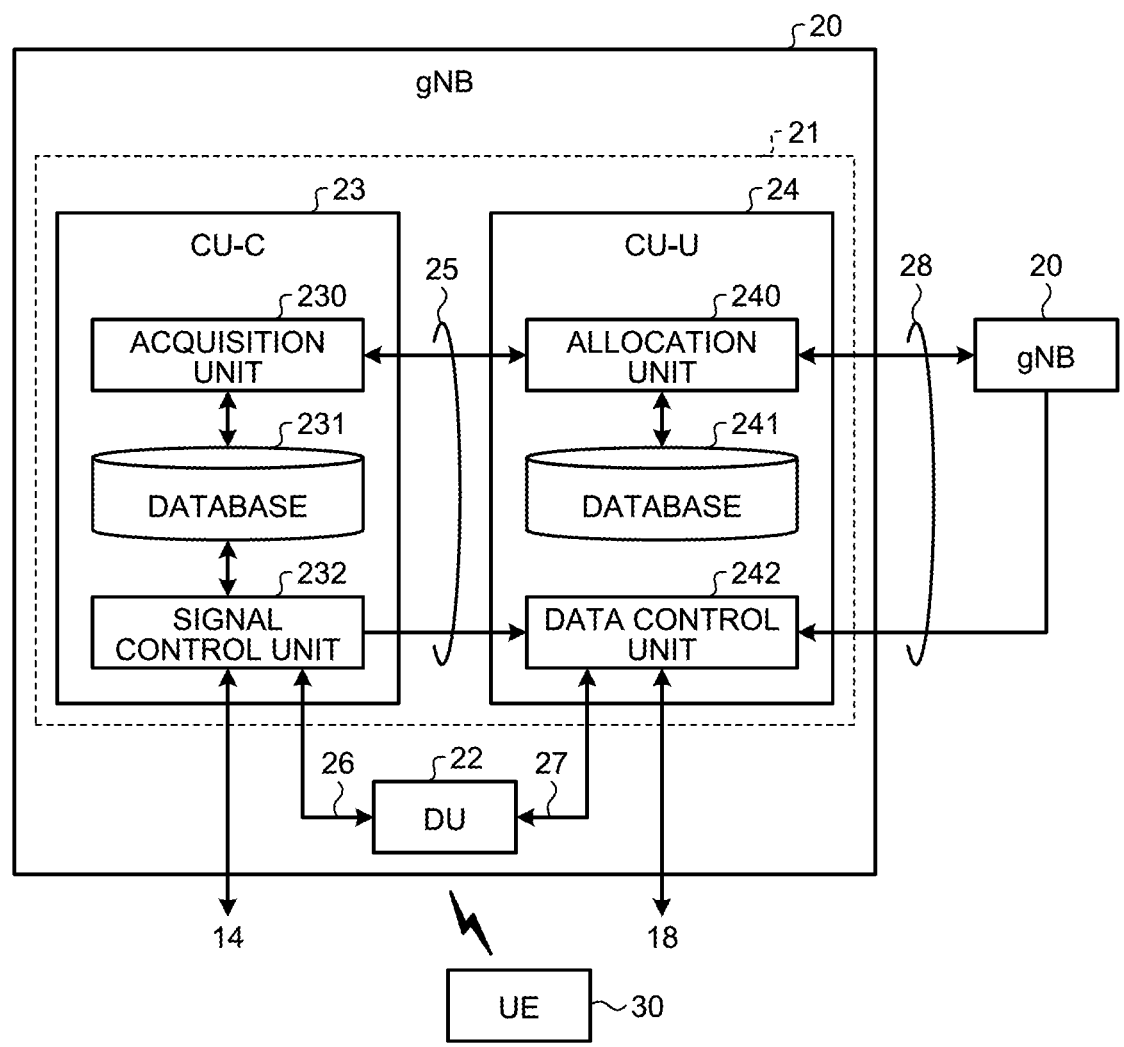
FIG. 2 is a block diagram illustrating a detailed example of a gNB in a first embodiment.

FIG. 2 is a block diagram illustrating a detailed example of each gNB 20 in the first embodiment. The CU-U 24 includes an allocation unit 240, a database 241, and a data control unit 242. In the example illustrated in FIG. 2, the allocation unit 240 is connected with the CU-C 23 in another gNB 20 through the I/F 28.

Figures 3, 4:
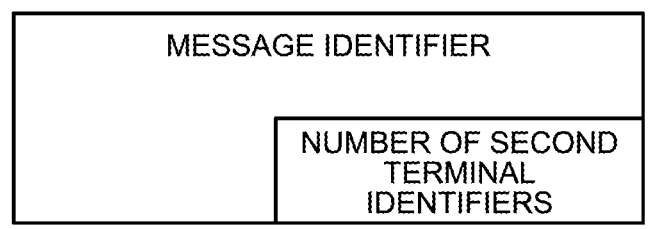
FIG. 3 is a diagram illustrating an exemplary identifier table in the first embodiment.
FIG. 4 is a diagram illustrating an exemplary terminal-identifier request message.

The database 241 holds an identifier table 2410 storing any second terminal identifier unique at the CU-U 24 as illustrated in, for example, FIG. 3. FIG. 3 is a diagram illustrating an exemplary identifier table 2410. The identifier table 2410 includes a non-use list including any second terminal identifier allocated to no CU-C 23, and an in-use list including any second terminal identifier allocated to either CU-C 23 as illustrated in, for example, FIG. 3. In the present embodiment, each second terminal identifier is an integer value. In the non-use list and the in-use list, the value of each of a plurality of second terminal identifiers is managed by using the start value of the value of the second terminal identifier and the range of the value of the second terminal identifier from the start value.

The allocation unit 240 executes processing of establishing the I/F 25 to the CU-C 23 in the gNB 20. Then, the allocation unit 240 receives a terminal-identifier request message 40 illustrated in, for example, FIG. 4 from the CU-C 23 in the gNB 20 through the I/F 25. FIG. 4 is a diagram illustrating an exemplary the terminal-identifier request message 40. The terminal-identifier request message 40 includes a message identifier indicating the terminal-identifier request message 40, and the number of second terminal identifiers requested by the CU-C 23.

When having received the terminal-identifier request message 40 from the CU-C 23, the allocation unit 240 refers to the non-use list of the identifier table 2410 in the database 241. Then, the allocation unit 240 selects the start value and range of the value of any second terminal identifier corresponding to the number of second terminal identifiers included in the terminal-identifier request message 40 received from the CU-C 23. Then, the allocation unit 240 transmits a terminal-identifier allocation message 41 including the selected start value and range of the value of any second terminal identifier to the CU-C 23 through the I/F 25.

FIG. 5 is a diagram illustrating an exemplary terminal-identifier allocation message 41. The terminal-identifier allocation message 41 includes a message identifier indicating the terminal-identifier allocation message 41, and the start value and range of the value of any second terminal identifier allocated to the CU-C 23 from which the request is made. Then, the allocation unit 240 moves the start value and range corresponding to the second terminal identifier allocated to the CU-C 23 by the terminal-identifier allocation message 41, from the non-use list to the in-use list in the identifier table 2410.

The allocation unit 240 also executes processing of establishing the I/F 28 to the CU-C 23 in the other gNB 20. Then, the allocation unit 240 receives the terminal-identifier request message 40 from the CU-C 23 in the other gNB 20 through the I/F 28, and selects the start value and range of the value of any second terminal identifier corresponding to the number of second terminal identifiers included in the terminal-identifier request message 40. Then, the allocation unit 240 transmits the terminal-identifier allocation message 41 including the selected start value and range of the value of any second terminal identifier to the CU-C 23 in the other gNB 20 through the I/F 28. Then, the allocation unit 240 moves the start value and range corresponding to the second terminal identifier allocated to the CU-C 23 by the terminal-identifier allocation message 41, from the non-use list to the in-use list in the identifier table 2410.

The data control unit 242 receives routing information including a first terminal identifier, a second terminal identifier, and the address information of the UPF 18 from the CU-C 23 through the I/F 25. Then, when having received a U-Plane signal including a second terminal identifier from the DU 22 through the I/F 27, the data control unit 242 replaces the second terminal identifier with a first terminal identifier corresponding to the second terminal identifier based on the routing information. Then, the data control unit 242 transmits the U-Plane signal including the first terminal identifier to the UPF 18 based on the routing information. The data control unit 242 may receive the routing information also from the CU-C 23 in the other gNB 20 through the I/F 28.

The CU-C 23 includes an acquisition unit 230, a database 231, and a signal control unit 232. The acquisition unit 230 may be connected with the CU-U 24 included in the other gNB 20 through the I/F 28 (not illustrated).

The database 231 holds an identifier table 2310 as illustrated in, for example, FIG. 6. FIG. 6 is a diagram illustrating an exemplary identifier table 2310. The identifier table 2310 includes second terminal identifiers allocated by the CU-U 24, and an in-use flag indicating whether each second terminal identifier is in use as illustrated in, for example, FIG. 6. When the acquisition unit 230 also processes a C-Plane signal corresponding to a U-Plane signal processed by the CU-U 24 of the other gNB 20, the database 231 holds the identifier table 2310 illustrated in, for example, FIG. 6 for each CU-U 24.

The acquisition unit 230 executes processing of establishing the I/F 25 to the CU-U 24 in the gNB 20. Then, the acquisition unit 230 transmits the terminal-identifier request message 40 illustrated in, for example, FIG. 4 to the CU-U 24. Then, the acquisition unit 230 receives the terminal-identifier allocation message 41 illustrated in, for example, FIG. 5 from the allocation unit 240 through the I/F 25. Then, the acquisition unit 230 stores, in the identifier table 2310 in the database 231, the values of second terminal identifiers specified by the start value and the range included in the terminal-identifier allocation message 41. Then, the acquisition unit 230 initializes the values of all in-use flags in the identifier table 2310 to "0" as a value indicating non-use.

Also when the CU-C 23 has established the I/F 28 to the CU-U 24 of the other gNB 20, the acquisition unit 230 transmits the terminal-identifier request message 40 to the CU-U 24 of the other gNB 20. Then, when having received the terminal-identifier allocation message 41 from the allocation unit 240 through the I/F 28, the acquisition unit 230 stores, in the identifier table 2310, the values of second terminal identifiers specified by the start value and the range included in the terminal-identifier allocation message 41. Then, the acquisition unit 230 initializes the values of all in-use flags in the identifier table 2310 to "0" as a value indicating non-use.

The signal control unit 232 performs C-Plane signal processing. For example, the signal control unit 232 receives an initial terminal message from the DU 22 and forwards the received initial terminal message to the AMF 14. Then, the signal control unit 232 receives an initial context establishment request including a first terminal identifier and the address information of the UPF 18 from the AMF 14. Then, the signal control unit 232 selects one second terminal identifier associated with the in-use flag at "0" indicating non-use with reference to the identifier table 2310 in the database 231. Then, the signal control unit 232 rewrites the value of the in-use flag associated with the selected second terminal identifier to "1" as a value indicating in-use.

Then, the signal control unit 232 replaces, with the selected second terminal identifier, the first terminal identifier included in the initial context establishment request received from the AMF 14. In addition, the signal control unit 232 replaces, with the address information of the CU-U 24, the address information of the UPF 18 included in the initial context establishment request received from the AMF 14. Then, the signal control unit 232 transmits the initial context establishment request with the replaced terminal identifier and address information to the DU 22.

In addition, the signal control unit 232 receives an initial context establishment response from the DU 22 and replaces, with the address information of the CU-U 24, the address information of the DU 22 included in the initial context establishment response. Then, the signal control unit 232 transmits the initial context establishment response with the replaced address information to the AMF 14. Then, the signal control unit 232 transmits the routing information to the CU-U 24.

The signal control unit 232 performs the same processing when processing a C-Plane signal corresponding to a U-Plane signal processed by the other gNB 20. Specifically, the signal control unit 232 replaces the first terminal identifier included in the initial context establishment request with the corresponding second terminal identifier, and replaces the address information of the UPF 18 with the address information of the CU-U 24 in the other gNB 20. Then, the signal control unit 232 receives the initial context establishment response from the DU 22 and replaces, with the address information of the CU-U 24 in the other gNB 20, the address information of the DU 22 included in the initial context establishment response. Then, the signal control unit 232 transmits the routing information to the CU-U 24 in the other gNB 20.

[Process of Processing at Wireless Communication System 10]

FIG. 7 is a sequence diagram illustrating an exemplary process of processing at the wireless communication system 10 in the first embodiment.

First, the CU-C 23 performs processing of establishing the I/F 25 to the CU-U 24 in the gNB 20 (S100). The CU-C 23 may also execute processing of establishing the I/F 28 to the CU-U 24 in the other gNB 20. Then, the acquisition unit 230 of the CU-C 23 transmits the terminal-identifier request message 40 illustrated in, for example, FIG. 4 to the CU-U 24 through the I/F 25 (S101).

The allocation unit 240 of the CU-U 24 having received the terminal-identifier request message 40 refers to the non-use list of the identifier table 2410 in the database 241. Then, the allocation unit 240 selects the start value and range of the value of any second terminal identifier corresponding to the number of second terminal identifiers included in the terminal-identifier request message 40 received from the CU-C 23 (S102). Then, the allocation unit 240 moves the start value and range corresponding to the selected second terminal identifiers, from the non-use list to the in-use list in the identifier table 2410.

Then, the allocation unit 240 transmits the terminal-identifier allocation message 41 (refer to FIG. 5) including the selected start value and range of the value of any second terminal identifier to the CU-C 23 through the I/F 25 (S103). The acquisition unit 230 of the CU-C 23 having received the terminal-identifier allocation message 41 stores, in the identifier table 2310, the values of second terminal identifiers specified by the start value and the range included in the terminal-identifier allocation message 41 in the database 231.

Subsequently, the DU 22 transmits the initial terminal message to the CU-C 23 in accordance with access from the UE 30 (S104). The signal control unit 232 of the CU-C 23 forwards the initial terminal message received from the DU 22 to the AMF 14 (S105). Accordingly, bearers corresponding to the UE 30 are established between the AMF 14 and the SMF 15 and between the SMF 15 and the UPF 18 (S106).

Subsequently, the AMF 14 transmits the initial context establishment request to the CU-C 23 (S107). The initial context establishment request includes a first terminal identifier and the address information of the UPF 18 that processes a C-Plane signal.

Subsequently, the signal control unit 232 of the CU-C 23 selects one unused second terminal identifier with reference to the identifier table 2310 in the database 231. Then, the signal control unit 232 replaces, with the selected second terminal identifier, the first terminal identifier included in the initial context establishment request, and replaces, with the address information of the CU-U 24, the address information of the UPF 18 included in the initial context establishment request (S108). Then, the signal control unit 232 transmits the initial context establishment request with the replaced terminal identifier and address information to the DU 22 (S109).

Subsequently, the DU 22 transmits the initial context establishment response to the CU-C 23 (S110). The initial context establishment response includes a third terminal identifier and the address information of the DU 22. The signal control unit 232 of the CU-C 23 replaces, with the address information of the CU-U 24, the address information of the DU 22 included in the initial context establishment response (S111). Then, the signal control unit 232 transmits the initial context establishment response with the replaced address information to the AMF 14 (S112).

Subsequently, the signal control unit 232 transmits the routing information to the CU-U 24 through the I/F 25 (S113). The routing information includes the first terminal identifier and the address information of the UPF 18 associated with the second terminal identifier, and the address information of the DU 22 associated with the third terminal identifier. The data control unit 242 of the CU-U 24 forwards a U-Plane signal received from the DU 22 to the UPF 18 based on the routing information received from the CU-C 23, and forwards the U-Plane signal received from the UPF 18 to the DU 22. Accordingly, communication of U-Plane signals is started between the DU 22 and the CU-U 24 and between the CU-U 24 and the UPF 18 (S114 and S115).

Effect of First Embodiment

The first embodiment is described above. The wireless communication system 10 according to the present embodiment includes the gNB 20, the UE 30, the AMF 14, and the UPF 18. The gNB 20 includes the CU 21 and the DU 22 that processes a wireless signal. The CU 21 includes the CU-C 23 that processes a control signal, and the CU-U 24 that processes user data. The CU-C 23 feeds, to the DU 22, a second terminal identifier unique at the CU-U 24, corresponding to a first terminal identifier fed from the AMF 14 that manages communication of the UE 30, and corresponding to the address information of the UPF 18 that performs user-data processing. The DU 22 associates communication with the UE 30 and communication with the CU-U 24 by using the fed second terminal identifier and relays communication of user data between the UE 30 and the CU-U 24. The CU-U 24 can allocate a second terminal identifier unique in the CU-U 24 to each CU-C 23, thereby avoiding duplication of the terminal identifier in U-Plane signals different from each other.

In addition, in the present embodiment, the CU-U 24 executes user-data processing corresponding to a control signal controlled by the CU-C 23 in the gNB 20 or the other gNB 20. The CU-C 23 receives allocation of a plurality of second terminal identifiers from the CU-U 24 and feeds, to the DU 22, a second terminal identifier selected from among the second terminal identifiers allocated by the CU-U 24. The CU-U 24 manages the second terminal identifiers and allocates, to each third processing unit, a second terminal identifier allocated to no CU-C 23 among the second terminal identifiers. Accordingly, it is possible to avoid duplication of terminal identifiers in U-Plane signals different from each other.

In addition, in the present embodiment, each CU-C 23 receives allocation of a plurality of second terminal identifiers from the CU-U 24 in advance before communication with the UE 30 is started. Accordingly, the CU-C 23 can swiftly start communication with the UE 30.

Figure 8:
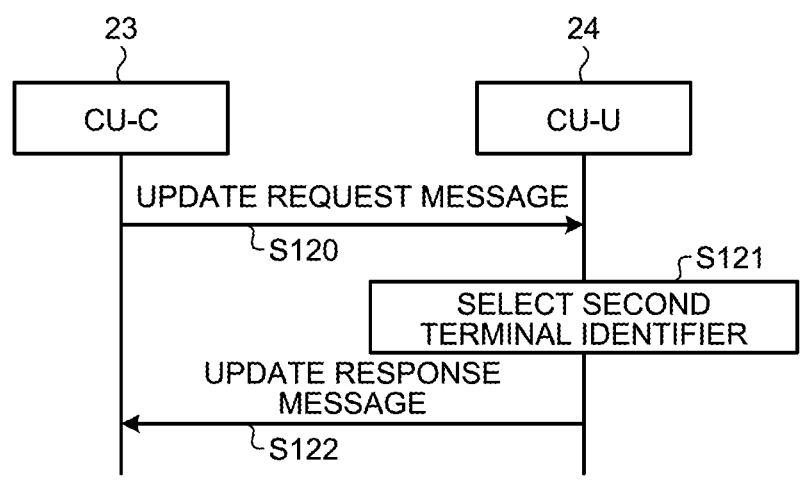
FIG. 8 is a sequence diagram illustrating an exemplary process of terminal-identifier update processing.

The number of second terminal identifiers allocated at step S103 becomes insufficient at each CU-C 23 due to change of the number of UEs 30 connected with the gNBs 20 in some cases. In such a case, the acquisition unit 230 of the CU-C 23 requests further allocation of second terminal identifiers. FIG. 8 is a sequence diagram illustrating an exemplary process of terminal-identifier update processing.

As illustrated in, for example, FIG. 8, the acquisition unit 230 of the CU-C 23 transmits an update request message to the CU-U 24 through the I/F 25 (S120). The update request message may be a message in a format same as that of the terminal-identifier request message 40 illustrated in, for example, FIG. 4.

The allocation unit 240 of the CU-U 24 having received the update request message selects, in the non-use list of the identifier table 2410 in the database 241, the start value and range of the value of any second terminal identifier corresponding to the number of second terminal identifiers included in the update request message (S121).

Then, the allocation unit 240 transmits an update response message including the selected start value and range of the value of any second terminal identifier to the CU-C 23 through the I/F 25 (S122). The update response message may be a message in a format same as that of the terminal-identifier allocation message 41 illustrated in, for example, FIG. 5. The acquisition unit 230 of the CU-C 23 having received the update response message stores, in the identifier table 2310 in the database 231, the values of second terminal identifiers specified by the start value and the range included in the update response message.

The number of second terminal identifiers in the CU-U 24 becomes insufficient in some cases as the number of CU-Cs 23 connected with one CU-U 24 increases due to further installation of the gNBs 20 or the like. In such a case, the allocation unit 240 of the CU-U 24 may transmit the update request message to each CU-C 23. The acquisition unit 230 of the CU-C 23 having received the update request message selects some unused second terminal identifiers with reference to the identifier table 2310 in the database 231. Then, the acquisition unit 230 transmits, to the CU-U 24, the update response message including the start value and the range corresponding to the value of each selected second terminal identifier. Then, the acquisition unit 230 deletes, from the identifier table 2310, the second terminal identifiers specified by the update response message. The allocation unit 240 moves the second terminal identifiers specified by the update response message, from the in-use list to the non-use list in the identifier table 2410.

The acquisition unit 230 of the CU-C 23 may autonomously return second terminal identifiers to the CU-U 24 when the number of unused second terminal identifiers in the identifier table 2310 is too large.

Second Embodiment

In the first embodiment, each CU-C 23 receives allocation of a plurality of second terminal identifiers from the CU-U 24 that controls U-Plane communication in advance before wireless communication between the UE 30 and the gNB 20 is started. However, in the present embodiment, each time wireless communication between the UE 30 and the gNB 20 is started, each CU-C 23 receives allocation of a second terminal identifier from the CU-U 24 that controls U-Plane communication.

Figure 9:
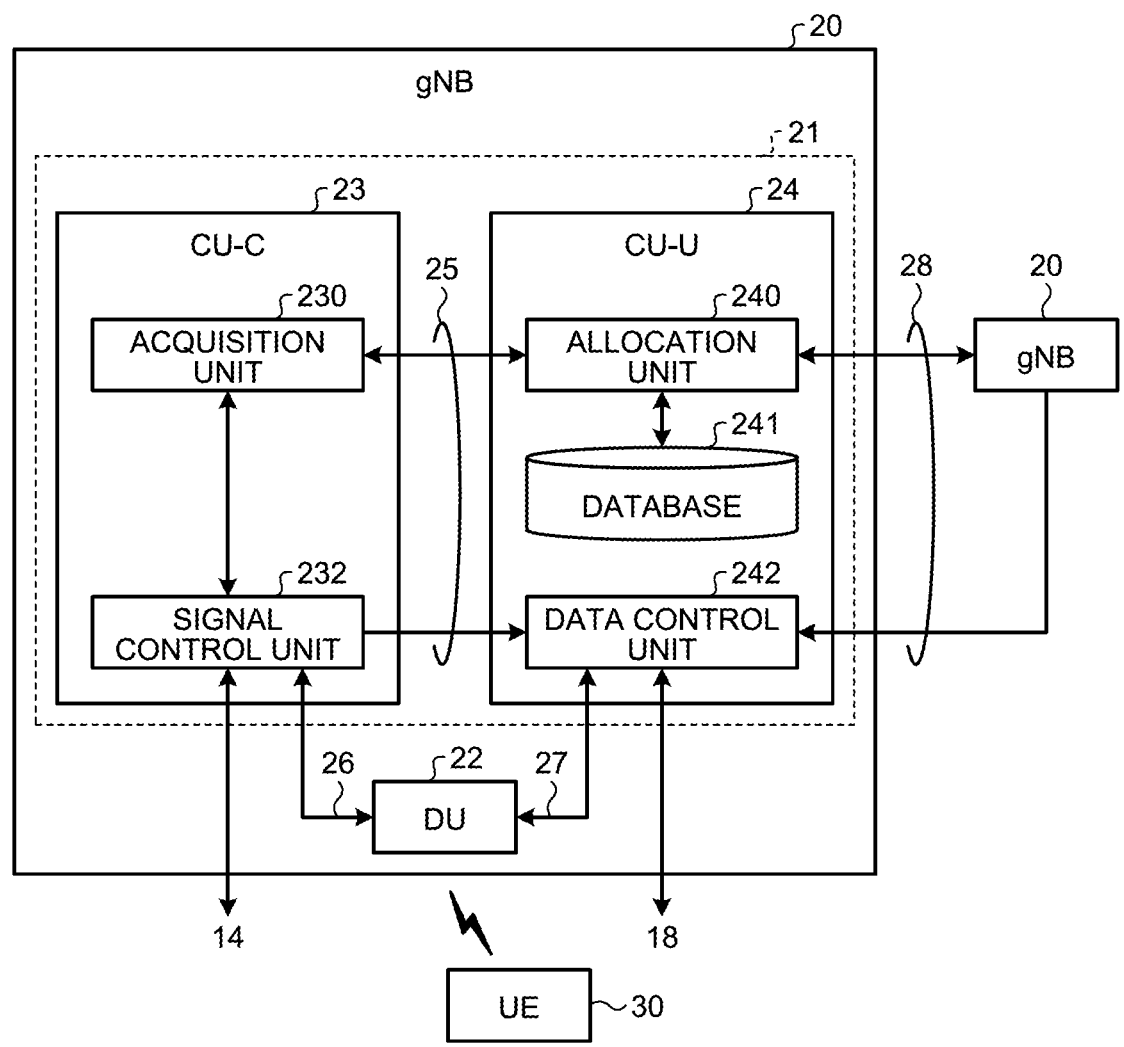
FIG. 9 is a block diagram illustrating a detailed example of a gNB in a second embodiment.

[Details of gNB 20] FIG. 9 is a block diagram illustrating a detailed example of the gNB 20 in the second embodiment. The CU-C 23 in the present embodiment includes the acquisition unit 230 and the signal control unit 232. Among blocks of the gNB 20 illustrated in FIG. 9, any block denoted by a reference sign same as that illustrated in FIG. 2 has functions same as those of the block described with reference to FIG. 2, and thus duplicate description thereof will be omitted.

The acquisition unit 230 transmits, in accordance with an instruction from the signal control unit 232, the terminal-identifier request message 40 (refer to FIG. 4) requesting a second terminal identifier to the CU-U 24 through the I/F 25. Then, when having received the terminal-identifier allocation message 41 (refer to FIG. 5) from the CU-U 24, the acquisition unit 230 feeds, to the signal control unit 232, any second terminal identifier corresponding to the start value and the range included in the terminal-identifier allocation message 41. In the present embodiment, one second terminal identifier is allocated by the CU-U 24 in one terminal-identifier allocation message 41, and thus the value of the range included in the terminal-identifier allocation message 41 is one. The terminal-identifier allocation message 41 may store the value of one second terminal identifier.

When having received the initial context establishment request from the AMF 14, the signal control unit 232 instructs the acquisition unit 230 to acquire a second terminal identifier. Then, when the second terminal identifier is fed from the acquisition unit 230, the signal control unit 232 replaces, with the second terminal identifier fed from the acquisition unit 230, the first terminal identifier included in the initial context establishment request. In addition, the signal control unit 232 replaces, with the address information of the CU-U 24, the address information of the UPF 18 included in the initial context establishment request. Then, the signal control unit 232 transmits the initial context establishment request with the replaced terminal identifier and address information to the DU 22.

[Process of Processing at Wireless Communication System 10]

Figure 10:
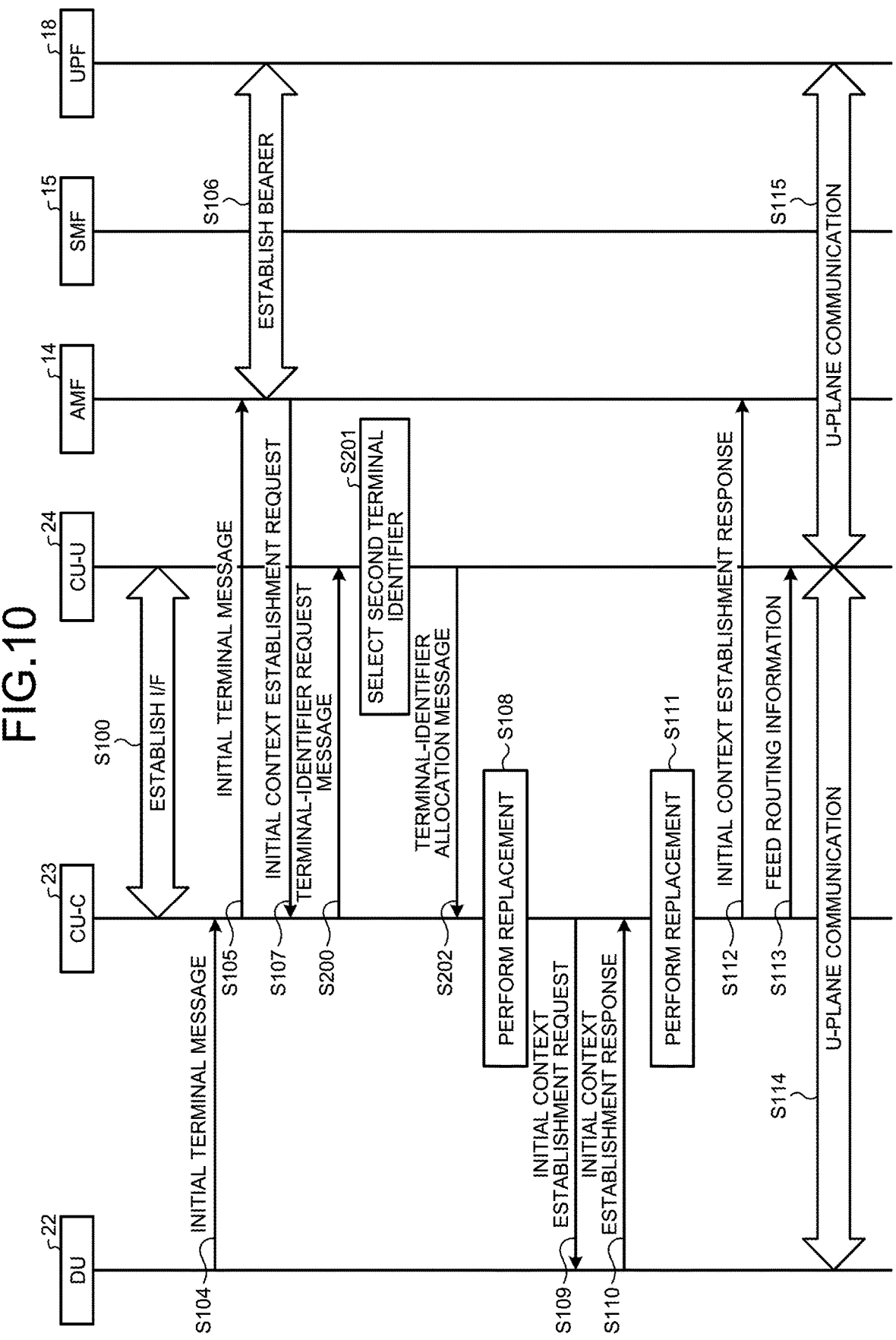
FIG. 10 is a sequence diagram illustrating an exemplary process of processing at a wireless communication system in the second embodiment.

FIG. 10 is a sequence diagram illustrating an exemplary process of processing at the wireless communication system 10 in the second embodiment. In FIG. 10, any processing denoted by a reference sign same as that in FIG. 7 is same as processing in the first embodiment described with reference to FIG. 7 except for features described below, and thus description thereof will be omitted.

When having received the initial context establishment request transmitted from the AMF 14 at step S107, the signal control unit 232 of the CU-C 23 instructs the acquisition unit 230 to acquire a second terminal identifier. The acquisition unit 230 transmits the terminal-identifier request message 40 to the CU-U 24 through the I/F 25 (S200).

The allocation unit 240 of the CU-U 24 having received the terminal-identifier request message 40 selects one unused second terminal identifier with reference to the non-use list of the identifier table 2410 in the database 241 (S201). Then, the allocation unit 240 transmits the terminal-identifier allocation message 41 including the start value and range of the value of the selected second terminal identifier to the CU-C 23 through the I/F 25 (S202). Then, the allocation unit 240 moves the second terminal identifier allocated to the CU-C 23 by the terminal-identifier allocation message 41, from the non-use list to the in-use list in the identifier table 2410.

The acquisition unit 230 of the CU-C 23 having received the terminal-identifier allocation message 41 feeds the value of a second terminal identifier specified by the start value and the range included in the terminal-identifier allocation message 41 to the signal control unit 232. The signal control unit 232 replaces, with the second terminal identifier fed from the acquisition unit 230, the first terminal identifier included in the initial context establishment request, and replaces, with the address information of the CU-U 24, the address information of the UPF 18 included in the initial context establishment request (S108). Then, the signal control unit 232 transmits the initial context establishment request with the replaced terminal identifier and address information to the DU 22. Thereafter, the processing at step S109 and later is executed.

Effect of Second Embodiment

The second embodiment is described above. The CU-U 24 according to the present embodiment executes user-data processing corresponding to a control signal controlled by the CU-C 23 in the gNB 20 or the other gNB 20. When a first terminal identifier and the address information of the UPF 18 are fed from the AMF 14, the CU-C 23 requests a second terminal identifier from the CU-U 24 and feeds the second terminal identifier allocated by the CU-U 24 to the DU 22. The CU-U 24 manages a plurality of second terminal identifiers and allocates, to each CU-C 23, a second terminal identifier allocated to no CU-C 23 among the second terminal identifiers. Accordingly, any second terminal identifier can be prevented from unnecessarily allocated to each CU-C 23.

Third Embodiment

In the second embodiment, second terminal identifiers are allocated irrespective of the existence of a response from the DU 22. Communication with the UE 30 is disconnected before U-Plane communication is established in some cases, depending on wireless environment. In such a case, second terminal identifiers are unnecessarily allocated. To avoid this, in the present embodiment, the CU-U 24 temporarily allocates second terminal identifiers in accordance with a request from the CU-C 23, and confirms the second terminal identifier allocation upon a response from the DU 22. With no response from the DU 22, the CU-U 24 cancels the second terminal identifier allocation. Accordingly, unnecessary allocation of second terminal identifiers can be further prevented.

The gNB 20 in the present embodiment is same as the gNB 20 illustrated in, for example, FIG. 9. The following describes difference from the second embodiment.

Figure 11:
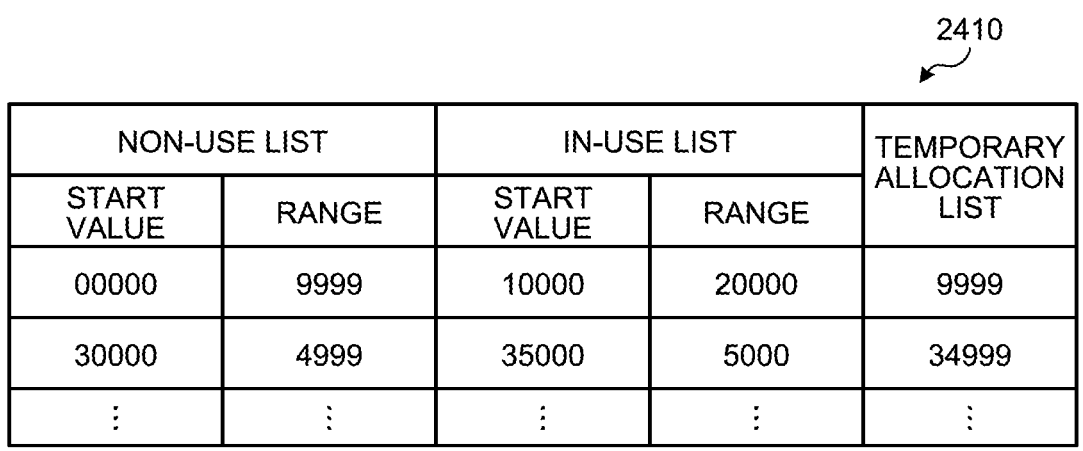
FIG. 11 is a diagram illustrating an exemplary identifier table in a third embodiment.

The database 241 holds the identifier table 2410 as illustrated in, for example, FIG. 11. FIG. 11 is a diagram illustrating an exemplary identifier table 2410 in the third embodiment. The identifier table 2410 according to the present embodiment includes a non-use list, an in-use list, and a temporary allocation list as illustrated in, for example, FIG. 11. The non-use list stores any second terminal identifier allocated to no CU-C 23. The in-use list stores a second terminal identifier allocated to any CU-C 23. The temporary allocation list stores any second terminal identifier, allocation of which is yet to be confirmed.

When having received the terminal-identifier request message 40 from the CU-C 23, the allocation unit 240 selects one unused second terminal identifier with reference to the non-use list of the identifier table 2410 in the database 241. Then, the allocation unit 240 moves the selected second terminal identifier, from the non-use list to the temporary allocation list. Then, the allocation unit 240 transmits the terminal-identifier allocation message 41 including the selected second terminal identifier to the CU-C 23 through the I/F 25.

Then, when having received an allocation confirmation message including the second terminal identifier from the CU-C 23, the allocation unit 240 specifies the second terminal identifier included in the allocation confirmation message in the temporary allocation list with reference to the identifier table 2410 in the database 241. Then, the allocation unit 240 moves the specified second terminal identifier, from the temporary allocation list to the in-use list. The allocation confirmation message is an exemplary allocation response.

When having received no allocation confirmation message including a terminal identifier identical to the second terminal identifier included in the terminal-identifier request message 40 within a predetermined time since transmission of the terminal-identifier request message 40, the allocation unit 240 performs, for example, the following processing. The allocation unit 240 specifies, in the temporary allocation list, the second terminal identifier included in the terminal-identifier request message 40, and moves the specified second terminal identifier, from the temporary allocation list to the non-use list. Accordingly, the allocation of the second terminal identifier is canceled.

When having received the initial context establishment request from the AMF 14, the signal control unit 232 instructs the acquisition unit 230 to acquire a second terminal identifier. Then, when the second terminal identifier is fed from the acquisition unit 230, the signal control unit 232 replaces, with the second terminal identifier fed from the acquisition unit 230, the first terminal identifier included in the initial context establishment request. In addition, the signal control unit 232 replaces, with the address information of the CU-U 24, the address information of the UPF 18 included in the initial context establishment request. Then, the signal control unit 232 transmits the initial context establishment request with the replaced terminal identifier and address information to the DU 22.

When having received the initial context establishment response from the DU 22, the signal control unit 232 transmits, to the CU-U 24, the allocation confirmation message including the second terminal identifier allocated by the CU-U 24.

[Process of Processing at Wireless Communication System 10]

Figure 12:
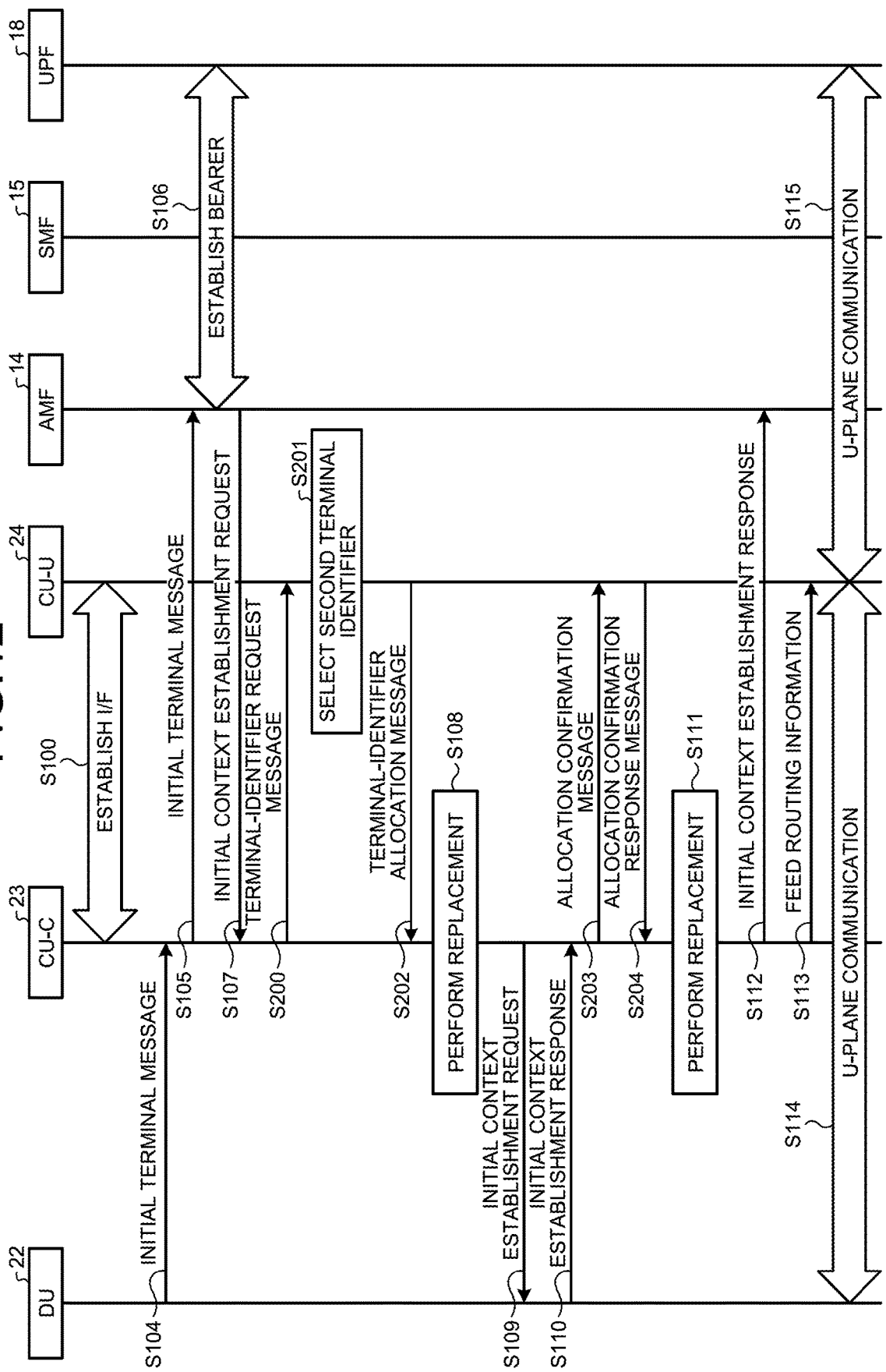
FIG. 12 is a sequence diagram illustrating an exemplary process of processing at a wireless communication system in the third embodiment.

FIG. 12 is a sequence diagram illustrating an exemplary process of processing at the wireless communication system 10 in the third embodiment. In FIG. 12, processing denoted by a reference sign same as that in FIG. 7 or 10 is same as processing described with reference to FIG. 7 or 10 except for features described below, and thus description thereof will be omitted.

When having received the terminal-identifier request message 40 from the CU-C 23 at step S200, the allocation unit 240 of the CU-U 24 selects one unused second terminal identifier with reference to the non-use list of the identifier table 2410 in the database 241 (S201). Then, the allocation unit 240 moves the selected second terminal identifier, from the non-use list to the temporary allocation list. Then, the allocation unit 240 transmits the terminal-identifier allocation message 41 including the selected second terminal identifier to the CU-C 23 through the I/F 25 (S202).

When having received the initial context establishment response transmitted from the DU 22 at step S110, the signal control unit 232 of the CU-C 23 transmits, to the CU-U 24, the allocation confirmation message including the second terminal identifier allocated by the CU-U 24 (S203).

Subsequently, the allocation unit 240 of the CU-U 24 specifies the second terminal identifier included in the allocation confirmation message in the temporary allocation list with reference to the identifier table 2410 in the database 241. Then, the allocation unit 240 moves the specified second terminal identifier, from the temporary allocation list to the in-use list. Then, the allocation unit 240 transmits an allocation confirmation response message to the CU-C 23 through the I/F 25 (S204). Thereafter, the processing at step S111 and later is executed.

After having transmitted the initial context establishment response at step S112, the signal control unit 232 of the CU-C 23 may transmit the allocation confirmation message at step S203. The signal control unit 232 may include the allocation confirmation message at step S203 in the routing information transmitted at step S113. Accordingly, the amount of signaling between the CU-C 23 and the CU-U 24 can be reduced.

Effect of Third Embodiment

The third embodiment is described above. In the present embodiment, when the first terminal identifier and the address information of the UPF 18 are fed from the AMF 14, each CU-C 23 requests a second terminal identifier from the CU-U 24. Then, each CU-C 23 feeds, to the DU 22, a second terminal identifier allocated by the CU-U 24, and transmits an allocation response to the CU-U 24 upon establishment of a communication path to the UE 30. When a second terminal identifier is requested by the CU-C 23, the CU-U 24 allocates, to the CU-C 23, a second terminal identifier allocated to no CU-C 23. Then, when having received no allocation response from the CU-C 23, the CU-U 24 cancels the allocation of the second terminal identifier to the CU-C 23. Accordingly, unnecessary allocation of second terminal identifiers can be further prevented.

Fourth Embodiment

In each embodiment described above, each CU-C 23 replaces the first terminal identifier specified by the AMF 14 with a second terminal identifier allocated by the CU-U 24. However, in the present embodiment, a second terminal identifier corresponding to combination of the first terminal identifier specified by the AMF 14 and the address information of the UPF 18 specified by the AMF 14 is generated. The second terminal identifier generated in the present embodiment uniquely identifies the combination of the first terminal identifier specified by the AMF 14 and the address information of the UPF 18 specified by the AMF 14. The combination of the first terminal identifier and the address information of the UPF 18 is also unique at the CU-U 24.

The second terminal identifier generated in the present embodiment may be generated by connecting the first terminal identifier specified by the AMF 14 and the address information of the UPF 18 specified by the AMF 14. The second terminal identifier generated in the present embodiment may be any identifier that uniquely identifies the combination of the first terminal identifier and the address information of the UPF 18, such as a numerical value or the like not related to the first terminal identifier and the address information of the UPF 18.

[Details of gNB 20]

Figure 13:
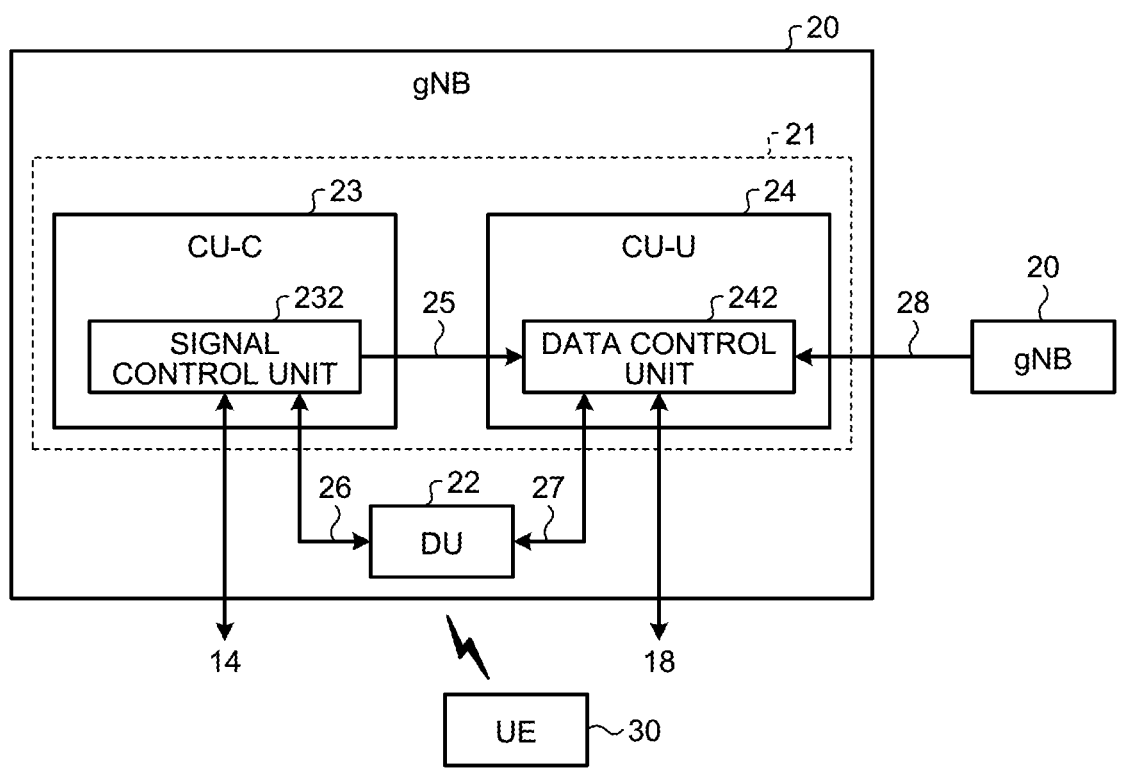
FIG. 13 is a block diagram illustrating a detailed example of a gNB in a fourth embodiment.

FIG. 13 is a block diagram illustrating a detailed example of the gNB 20 in the fourth embodiment. Among blocks of the gNB 20 illustrated in FIG. 13, any block denoted by a reference sign same as that illustrated in FIG. 2 has functions same as those of the block described with reference to FIG. 2 except for features described below, and thus duplicate description thereof will be omitted.

When having received the initial context establishment request from the AMF 14, the signal control unit 232 generates, as a second terminal identifier, an identifier that uniquely identifies combination of the first terminal identifier and the address information of the UPF 18 included in the initial context establishment request. In the present embodiment, the signal control unit 232 generates the second terminal identifier by connecting the first terminal identifier and the address information of the UPF 18 included in the initial context establishment request.

Then, the signal control unit 232 replaces, with the generated second terminal identifier, the first terminal identifier included in the initial context establishment request received from the AMF 14. In addition, the signal control unit 232 replaces, with the address information of the CU-U 24, the address information of the UPF 18 included in the initial context establishment request received from the AMF 14. Then, the signal control unit 232 transmits the initial context establishment request with the replaced terminal identifier and address information to the DU 22.

In addition, the signal control unit 232 receives the initial context establishment response from the DU 22 and replaces, with the address information of the CU-U 24, the address information of the DU 22 included in the initial context establishment response. Then, the signal control unit 232 transmits the initial context establishment response with the replaced address information to the AMF 14. Then, the signal control unit 232 transmits the routing information to the CU-U 24.

[Process of processing at wireless communication system 10]

Figure 14:
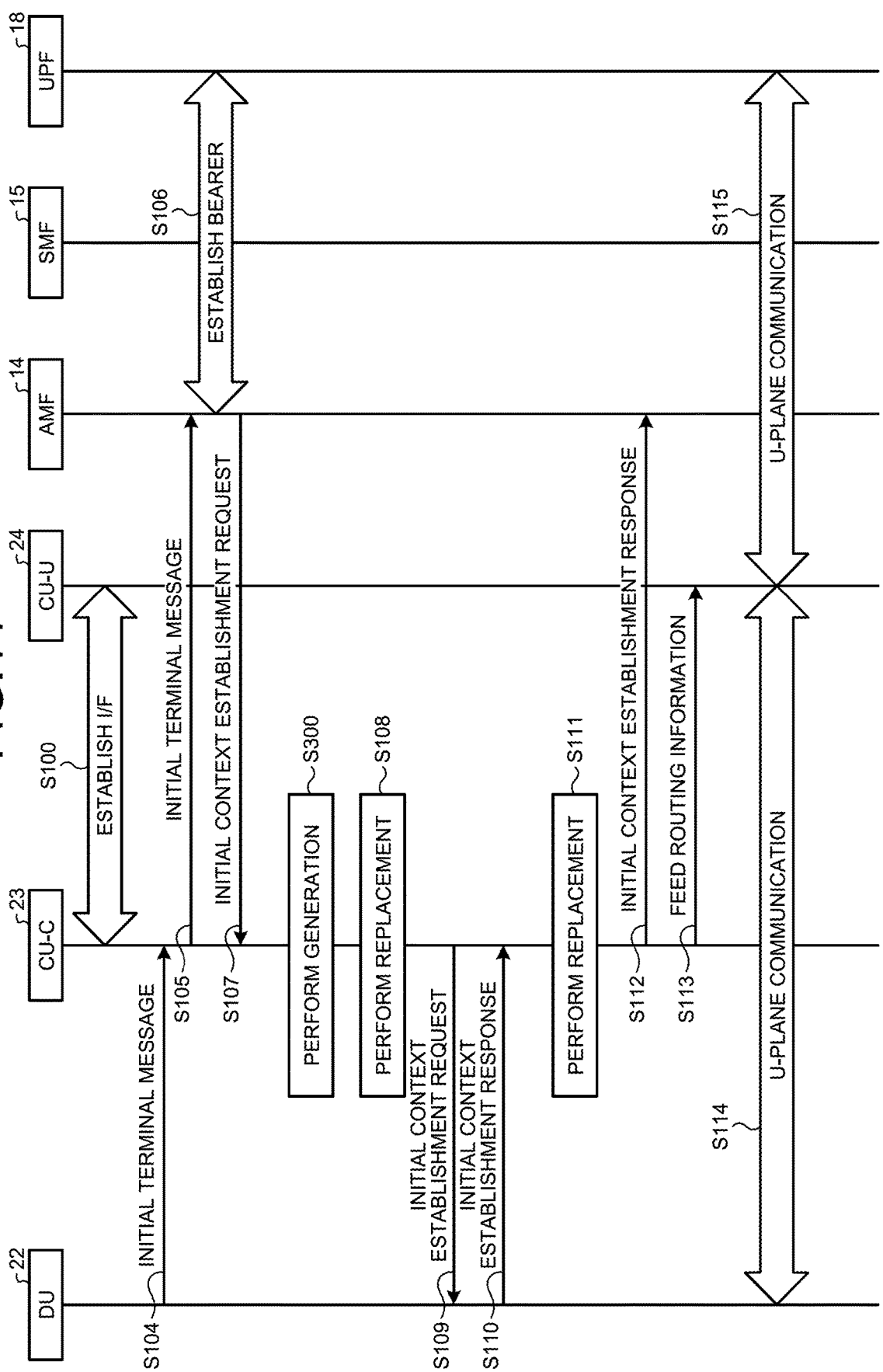
FIG. 14 is a sequence diagram illustrating an exemplary process of processing at a wireless communication system in the fourth embodiment.

FIG. 14 is a sequence diagram illustrating an exemplary process of processing at the wireless communication system 10 in the fourth embodiment. In FIG. 14, processing denoted by a reference sign same as that in FIG. 7 is same as processing described with reference to FIG. 7 except for features described below, and thus description thereof will be omitted.

When having received the initial context establishment request from the AMF 14 at step S107, the signal control unit 232 of the CU-C 23 acquires the first terminal identifier and the address information of the UPF 18 from the initial context establishment request. Then, the signal control unit 232 generates a second terminal identifier by connecting the first terminal identifier and the address information of the UPF 18 thus acquired (S300).

Then, the signal control unit 232 replaces, with the generated second terminal identifier, the first terminal identifier included in the initial context establishment request, and replaces, with the address information of the CU-U 24, the address information of the UPF 18 included in the initial context establishment request (S108). Then, the signal control unit 232 transmits the initial context establishment request with the replaced terminal identifier and address information to the DU 22. Thereafter, the processing at step S109 and later is executed.

Effect of Fourth Embodiment

The fourth embodiment is described above. In the present embodiment, the CU-U 24 executes user-data processing corresponding to a control signal controlled by the CU-C 23 in the gNB 20 or the other gNB 20. Each CU-C 23 generates a second terminal identifier unique at the CU-U 24 by using the first terminal identifier and the address information of the UPF 18 fed from the AMF 14. Accordingly, the uniqueness of the terminal identifier at the gNB 20 can be maintained with a simple configuration.

Alternatively, the CU-C 23 may generate a second terminal identifier by connecting the first terminal identifier and the address information of the UPF 18 fed from the AMF 14.

Accordingly, the uniqueness of the terminal identifier at the gNB 20 can be maintained with a simpler configuration.

Fifth Embodiment

In each embodiment described above, the CU-C 23 instructs the CU-U 24 to perform U-Plane communication with a UPF 18 specified by the AMF 14. However, a large number of UPFs 18 exist in the core network 11, and thus a UPF 18 not connected with any CU-U 24 is specified by the AMF 14 in some cases. When a UPF 18 specified by the AMF 14 is allocated to the CU-U 24 not connected with the UPF 18, it is difficult for the CU 21 to relay the U-Plane communication from the UE 30.

Thus, the CU-C 23 according to the present embodiment acquires information of a connectable UPF 18 from each of a plurality of CU-Us 24 in advance and allocates the U-Plane communication to a CU-U 24 connectable with a UPF 18 specified by the AMF 14. Accordingly, the CU-U 24 to which the U-Plane communication is allocated by the CU-C 23 can relay the U-Plane communication to the UPF 18 specified by the AMF 14.

[Details of gNB 20]

The gNB 20 in the present embodiment is same as the gNB 20 in the first embodiment described with reference to FIG. 2 except for features described below, and thus the following mainly describes difference from the gNB 20 in the first embodiment. In the present embodiment, the CU-C 23 is connected with a plurality of CU-Us 24 through the I/F 25 or the I/F 28.

The database 241 in each CU-U 24 additionally holds a UPF list storing information for identifying any UPF 18 with which the CU-U 24 is connectable. The information for specifying any UPF 18 is, for example, the address information of the UPF 18, and service related information such as a network slice of the UPF 18 and a dedicated core (DC). The information for identifying any UPF 18 is an exemplary higher-level identifier.

When having received a UPF list request message from the CU-C 23 through the I/F 25 or the I/F 28, the allocation unit 240 produces a UPF list message 42 including the UPF list in the database 241. Then, the allocation unit 240 transmits the produced UPF list message 42 to the CU-C 23 through the I/F 25 or the I/F 28.

Figure 15:
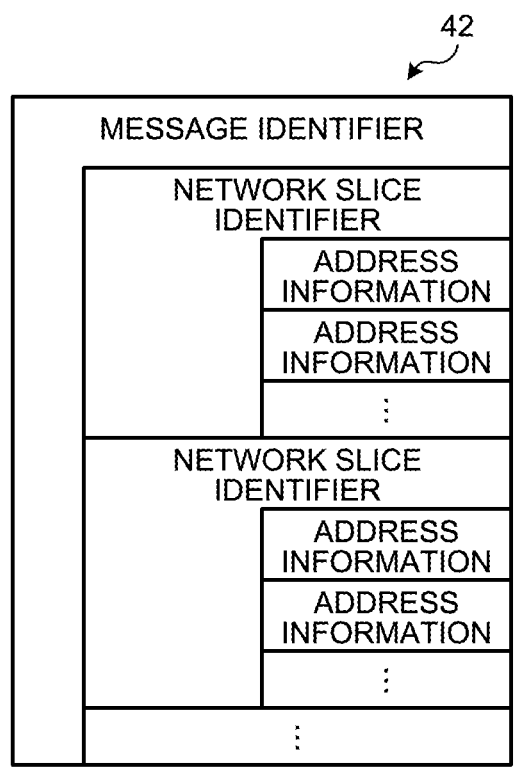
FIG. 15 is a diagram illustrating an exemplary UPF list message.

FIG. 15 is a diagram illustrating an exemplary UPF list message 42. The UPF list message 42 includes a message identifier as the UPF list message 42, and the address information of a UPF 18 for each network slice identifier. The address information of the UPF 18 is, for example, IP address information or a fully qualified domain name (FQDN).

Figure 16:
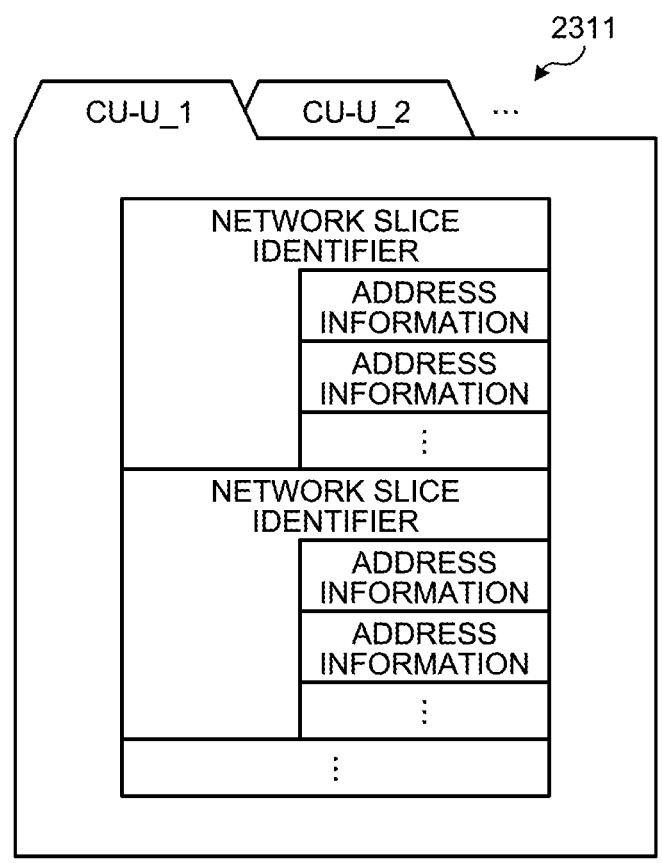
FIG. 16 is a diagram illustrating an exemplary CU-U table.

The database 231 of the CU-C 23 additionally holds a CU-U table 2311 as illustrated in, for example, FIG. 16. FIG. 16 is a diagram illustrating an exemplary CU-U table 2311. The CU-U table 2311 holds, in association with each CU-U 24, the address information of a UPF 18 with which the CU-U 24 is connectable for each network slice identifier as illustrated in, for example, FIG. 16.

The acquisition unit 230 transmits the UPF list request message to each CU-U 24 through the I/F 25 or the I/F 28. Then, when having received the UPF list message 42 (refer to FIG. 15) from the allocation unit 240 through the I/F 25 or the I/F 28, the acquisition unit 230 stores, in the CU-U table 2311 in the database 231, the UPF list included in the UPF list message 42.

When having received the initial context establishment request including the first terminal identifier and the address information of the UPF 18 from the AMF 14, the signal control unit 232 refers to the CU-U table 2311 in the database 231. Then, the signal control unit 232 selects one CU-U 24 from among CU-Us 24 associated with the address information of the UPF 18 included in the initial context establishment request. Then, the signal control unit 232 replaces, with a second terminal identifier, the first terminal identifier included in the initial context establishment request, and replaces, with the address information of the selected CU-U 24, the address information of the UPF 18 included in the initial context establishment request. Then, the signal control unit 232 transmits the initial context establishment request with the replaced terminal identifier and address information to the DU 22.

In addition, when having received the initial context establishment response from the DU 22, the signal control unit 232 replaces, with the address information of the selected CU-U 24, the address information of the DU 22 included in the initial context establishment response. Then, the signal control unit 232 transmits the initial context establishment response with the replaced address information to the AMF 14. Then, the signal control unit 232 transmits the routing information to the selected CU-U 24.

[Process of Processing at Wireless Communication System 10]

Figure 17:
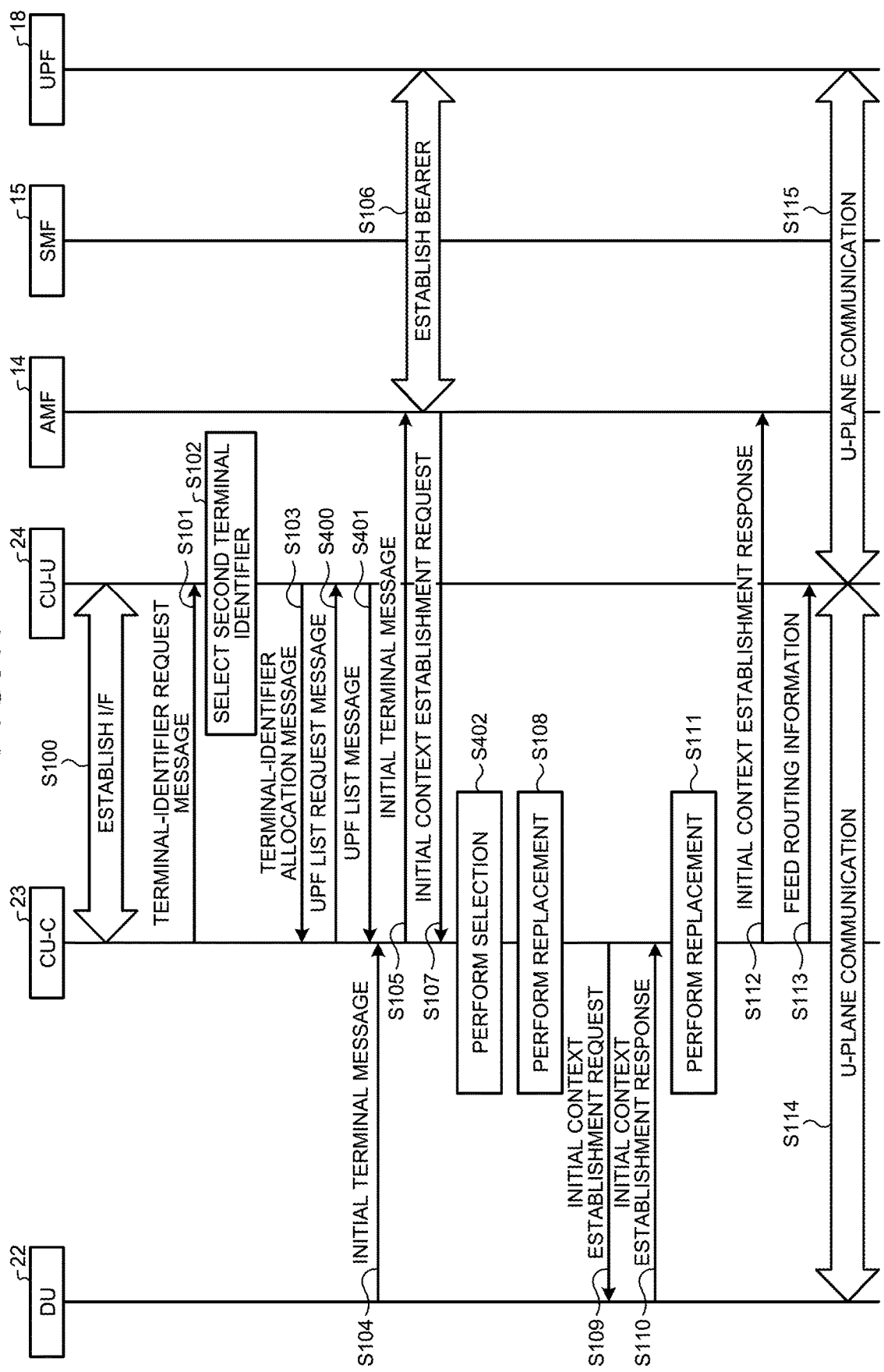
FIG. 17 is a sequence diagram illustrating an exemplary process of processing at a wireless communication system in a fifth embodiment.

FIG. 17 is a sequence diagram illustrating an exemplary process of processing at the wireless communication system 10 in the fifth embodiment. In FIG. 17, any processing denoted by a reference sign same as that in FIG. 7 is same as processing in the first embodiment described with reference to FIG. 7 except for features described below, and thus description thereof will be omitted.

After step S103, the acquisition unit 230 transmits the UPF list request message to each CU-U 24 through the I/F 25 or the I/F 28 (S400).

When having received the UPF list request message from the CU-C 23 through the I/F 25 or the I/F 28, the allocation unit 240 produces the UPF list message 42 including the UPF list in the database 241. Then, the allocation unit 240 transmits the produced UPF list message 42 to the CU-C 23 through the I/F 25 or the I/F 28 (S401). The acquisition unit 230 stores, in the CU-U table 2311 in the database 231, the UPF list included in the UPF list message 42 received through the I/F 25 or the I/F 28.

In addition, when having received the initial context establishment request transmitted from the AMF 14 at step S107, the signal control unit 232 of the CU-C 23 refers to the CU-U table 2311 in the database 231. Then, the signal control unit 232 selects one CU-U 24 from among CU-Us 24 associated with the address information of the UPF 18 included in the initial context establishment request (S402). Then, the signal control unit 232 replaces, with a second terminal identifier, the first terminal identifier included in the initial context establishment request, and replaces, with the address information of the selected CU-U 24, the address information of the UPF 18 included in the initial context establishment request (S108). Then, the signal control unit 232 transmits the initial context establishment request with the replaced terminal identifier and address information to the DU 22 (S109). Then, the processing at step S110 and later is executed.

Effect of Fifth Embodiment

The fifth embodiment is described above. In the present embodiment, the CU-C 23 executes processing of a control signal corresponding to a U-Plane signal controlled by the CU-U 24 in the gNB 20 or the other gNB 20. In addition, the CU-C 23 acquires, from each CU-U 24, information related to any UPF 18 with which the CU-U 24 is connectable, and selects a CU-U 24 that executes U-Plane signal processing with the UE 30 from among the CU-Us 24 based on the acquired information. Then, the CU-C 23 feeds a second terminal identifier unique at the selected CU-U 24 to the DU 22. Accordingly, the CU-U 24 can relay U-Plane communication with a UPF 18 specified by the AMF 14.

[Hardware]

Figure 18:
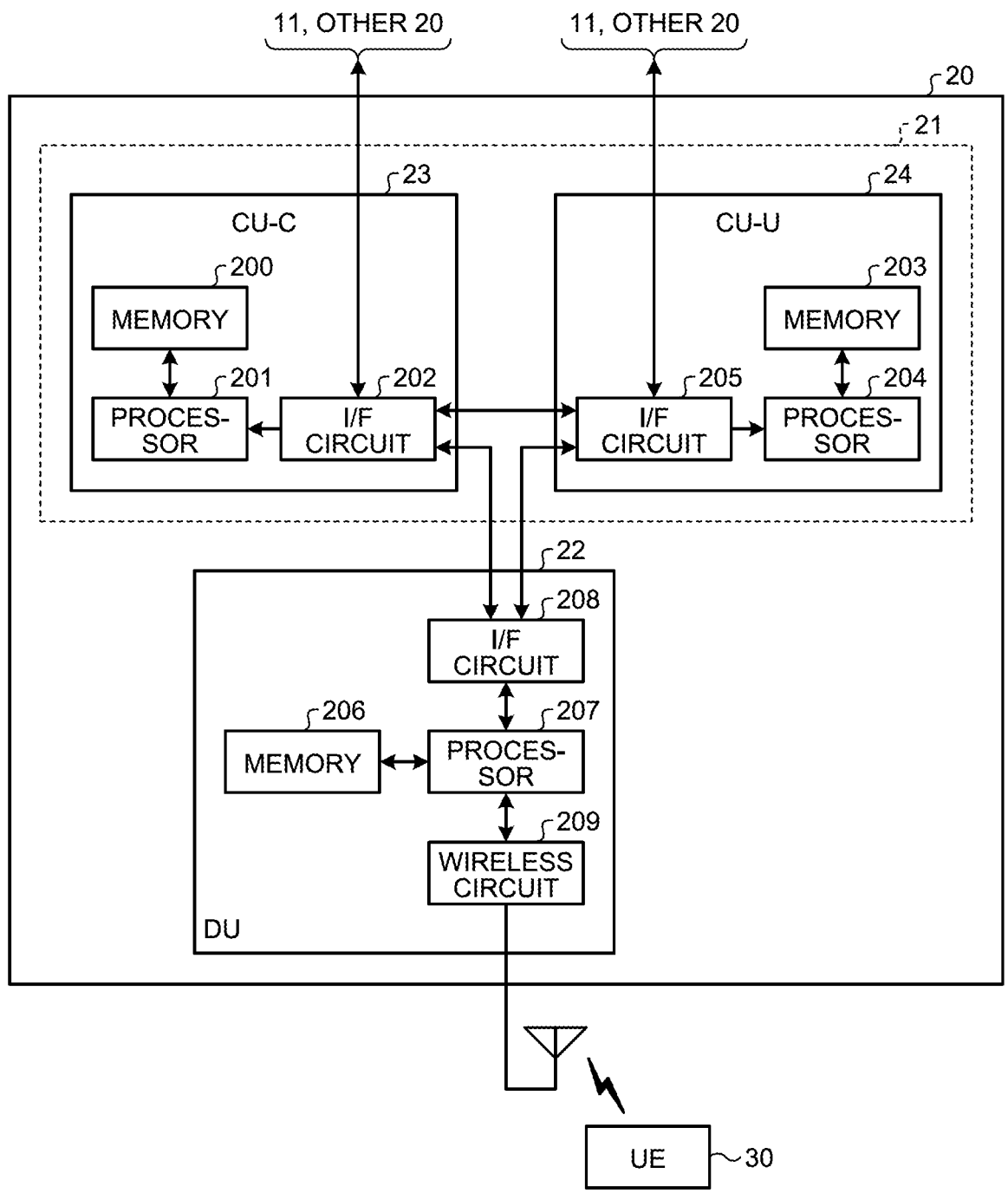
FIG. 18 is a diagram illustrating exemplary hardware of a gNB.

Each gNB 20 in the first to the fifth embodiments described above is achieved by hardware as illustrated in, for example, FIG. 18. FIG. 18 is a diagram illustrating exemplary hardware of the gNB 20. The gNB 20 includes the CU 21 and the DU 22. The CU 21 includes the CU-C 23 and the CU-U 24.

The CU-C 23 includes a memory 200, a processor 201, and an I/F circuit 202. The I/F circuit 202 transmits and receives signals to and from each of the core network 11, the other gNB 20, the DU 22, and the CU-U 24. The memory 200 stores various computer programs, data, and the like for achieving, for example, functions of the CU-C 23. The memory 200 stores, for example, data in the database 231. The processor 201 reads a computer program from the memory 200 and executes the read computer program, thereby achieving, for example, each function of the CU-C 23. Specifically, the processor 201 executes a computer program read from the memory 200, thereby achieving functions of the acquisition unit 230 and the signal control unit 232.

The CU-U 24 includes a memory 203, a processor 204, and an I/F circuit 205. The memory 203 transmits and receives signals to and from each of the core network 11, the other gNB 20, the DU 22, and the CU-C 23. The memory 203 stores various computer programs, data, and the like for achieving, for example, functions of the CU-U 24. The memory 203 stores, for example, data in the database 241. The processor 204 reads a computer program form the memory 203 and executes the read computer program, thereby achieving, for example, each function of the CU-U 24. Specifically, the processor 204 executes a computer program read from the memory 203, thereby achieving functions of the allocation unit 240 and the data control unit 242.

The DU 22 includes a memory 206, a processor 207, an I/F circuit 208, and a wireless circuit 209. The I/F circuit 208 transmits and receives signals to and from each of the CU-C 23 and the CU-U 24. The wireless circuit 209 transmits and receives wireless signals to and from the UE 30. The memory 206 stores various computer programs, data, and the like for achieving, for example, functions of the DU 22. The processor 207 reads a computer program from the memory 206 and executes the read computer program, thereby achieving, for example, functions of the DU 22.

Not all of computer programs, data, and the like in the memory 200 necessarily need to be initially stored in the memory 200. For example, the computer programs, the data, and the like may be stored in a portable recording medium such as a memory card inserted into the DU 22, and the DU 22 may acquire and execute as appropriate the computer programs, the data, and the like from such a portable recording medium. Alternatively, the DU 22 may acquire and execute as appropriate a computer program from, for example, another computer or server device storing the computer programs, the data, and the like through a wireless communication line, a public line, the Internet, a LAN, a WAN, or the like. This is same for the memories 203 and 206.

OTHER

The disclosed technology is not limited to the above-described embodiments but may be modified in various manners within the scope thereof.

For example, in the above-described embodiments, the DU 22, the CU-C 23, and the CU-U 24 are each described as one device including a memory and a processor, but the disclosed technology is not limited thereto. For example, the gNB 20 may be achieved as one device, and the DU 22, the CU-C 23, and the CU-U 24 may each function as a processing unit of the gNB 20. Alternatively, some or all of the DU 22, the CU-C 23, and the CU-U 24 may be achieved by a plurality of devices each including a memory and a processor.

In the above-described embodiments, each processing block included in the CU-C 23 and the CU-U 24 is functionally classified in accordance with main processing contents to facilitate understanding of the CU-C 23 and the CU-U 24 in the embodiments. Thus, the disclosed technology is not restricted by the classification method and the name of the processing block. The processing blocks included in the CU-C 23 and the CU-U 24 in the above-described embodiments may be segmentalized into a larger number of processing blocks in accordance with the processing contents, or some processing blocks may be integrated into one processing block. In addition, processing executed by each processing block may be achieved as software processing or may be achieved by dedicated hardware such as an application specific integrated circuit (ASIC).

The disclosed technology is intended to solve the above-described problem and provide a base station, a terminal, a processing method, and a wireless communication system with which it is possible to maintain uniqueness of each terminal identifier at a base station.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station comprising:
a first processor circuit; and
a second processor circuit configured to processes a wireless signal, wherein
the first processor circuit includes
a third processor circuit configured to processes a control signal, and
a fourth processor circuit configured to processes user data, and wherein
the third processor circuit shares, with the fourth processor circuit, a second terminal identifier used in user-data processing performed in the second processor circuit and the fourth processor circuit, and wherein when, from a first higher-level device, a first terminal identifier and a higher-level identifier identifying a second higher-level device that performs user-data processing are fed, the third processor circuit requests the second terminal identifier from the fourth processor circuit and feeds, to the second processor circuit, the second terminal identifier allocated by the fourth processor circuit, and the fourth processor circuit allocates the second terminal identifier to the third processor circuit, and wherein when the first terminal identifier is fed from the first higher-level device, the third processor circuit requests the second terminal identifier from the fourth processor circuit and feeds, to the second processor circuit, the second terminal identifier allocated by the fourth processor circuit and transmits an allocation response to the fourth processor circuit upon establishment of a communication path to a terminal, and when the second terminal identifier is requested by the third processor circuit, the fourth processor circuit allocates the second terminal identifier to the third processor circuit and cancels the allocation of the second terminal identifier to the third processor circuit upon no reception of the allocation response from the third processor circuit.

2. The base station according to claim 1, wherein
the third processor circuit receives allocation of the second terminal identifiers from the fourth processor circuit in advance before communication with a terminal is started, and
the fourth processor circuit allocates the second terminal identifier to the third processor circuit before communication with the terminal is started.

3. The base station according to claim 2, wherein
when a first terminal identifier is fed from the first higher-level device, the third processor circuit feeds, to the second processor circuit, the second terminal identifier selected from among the second terminal identifiers allocated by the fourth processor circuit.

4. The base station according to claim 1, wherein
the third processor circuit generates the second terminal identifier used in user-data processing performed in the second processor circuit and the fourth processor circuit by using a first terminal identifier and the higher-level identifier fed from the first higher-level device.

5. The base station according to claim 4, wherein
the higher-level identifier is address information of a second higher-level device, and
the third processor circuit generates the second terminal identifier by connecting the first terminal identifier and the address information of the second higher-level device fed from the first higher-level device.

6. The base station according to claim 1, wherein
the third processor circuit acquires, from each fourth processor circuit, information related to a second higher-level device with which the fourth processor circuit is connectable, selects the fourth processor circuit that executes processing of user data with a terminal from among a plurality of the fourth processor circuits based on the acquired information, and feeds, to the second processor circuit, the second terminal identifier used in user-data processing performed in the second processor circuit and the selected fourth processor circuit.

7. A terminal that performs communication with a base station including a first processor circuit and a second processor circuit that processes a wireless signal, the terminal comprising:

a communication unit that associates a first terminal identifier and a second terminal identifier, the first terminal identifier being fed from a first higher-level device to a third processor circuit that processes a control signal among a plurality of first processor circuits, the second terminal identifier corresponding to a higher-level identifier identifying a second higher-level device that performs user-data processing, the communication unit being configured to perform transmission and reception, in accordance with the second terminal identifier, with the second processor circuit that relays communication with a fourth processor circuit that processes user data among the plurality of first processor circuits and wherein when, from the first higher-level device, the first terminal identifier and the higher-level identifier identifying the second higher-level device that performs user-data processing are fed, the third processor circuit requests the second terminal identifier from a fourth processor circuit and feeds, to the second processor circuit, the second terminal identifier allocated by the fourth processor circuit, and the fourth processor circuit allocates the second terminal identifier to the third processor circuit, and wherein when the first terminal identifier is fed from the first higher-level device, the third processor circuit requests the second terminal identifier from the fourth processor circuit and feeds, to the second processor circuit, the second terminal identifier allocated by the fourth processor circuit and transmits an allocation response to the fourth processor circuit upon establishment of a communication path to a terminal, and when the second terminal identifier is requested by the third processor circuit, the fourth processor circuit allocates the second terminal identifier to the third processor circuit and cancels the allocation of the second terminal identifier to the third processor circuit upon no reception of the allocation response from the third processor circuit.

8. A wireless communication system including a base station, a terminal, a first higher-level device that manages communication of the terminal, and a second higher-level device that performs user-data processing, wherein
the base station includes
a first processor circuit; and
a second processor circuit configured to processes a wireless signal, wherein
the first processor circuit includes
a third processor circuit configured to processes a control signal, and
a fourth processor circuit configured to processes user data, and wherein
the third processor circuit shares, with the fourth processor circuit, a second terminal identifier used in user-data processing performed in the second processor circuit and the fourth processor circuit, and wherein
when, from a first higher-level device, a first terminal identifier and a higher-level identifier identifying a second higher-level device that performs user-data processing are fed, the third processor circuit requests the second terminal identifier from the fourth processor circuit and feeds, to the second processor circuit, the second terminal identifier allocated by the fourth processor circuit, and the fourth processor circuit allocates the second terminal identifier to the third processor circuit, and wherein when the first terminal identifier is fed from the first higher-level device, the third processor circuit requests the second terminal identifier from the fourth processor circuit and feeds, to the second processor circuit, the second terminal identifier allocated by the fourth processor circuit and transmits an allocation response to the fourth processor circuit upon establishment of a communication path to a terminal, and when the second terminal identifier is requested by the third processor circuit, the fourth processor circuit allocates the second terminal identifier to the third processor circuit and cancels the allocation of the second terminal identifier to the third processor circuit upon no reception of the allocation response from the third processor circuit.

\* \* \* \* \*